March 27, 1956
C. A. BROWN
2,739,580
HYDRAULIC VALVE LIFTER
Filed Oct. 13, 1953
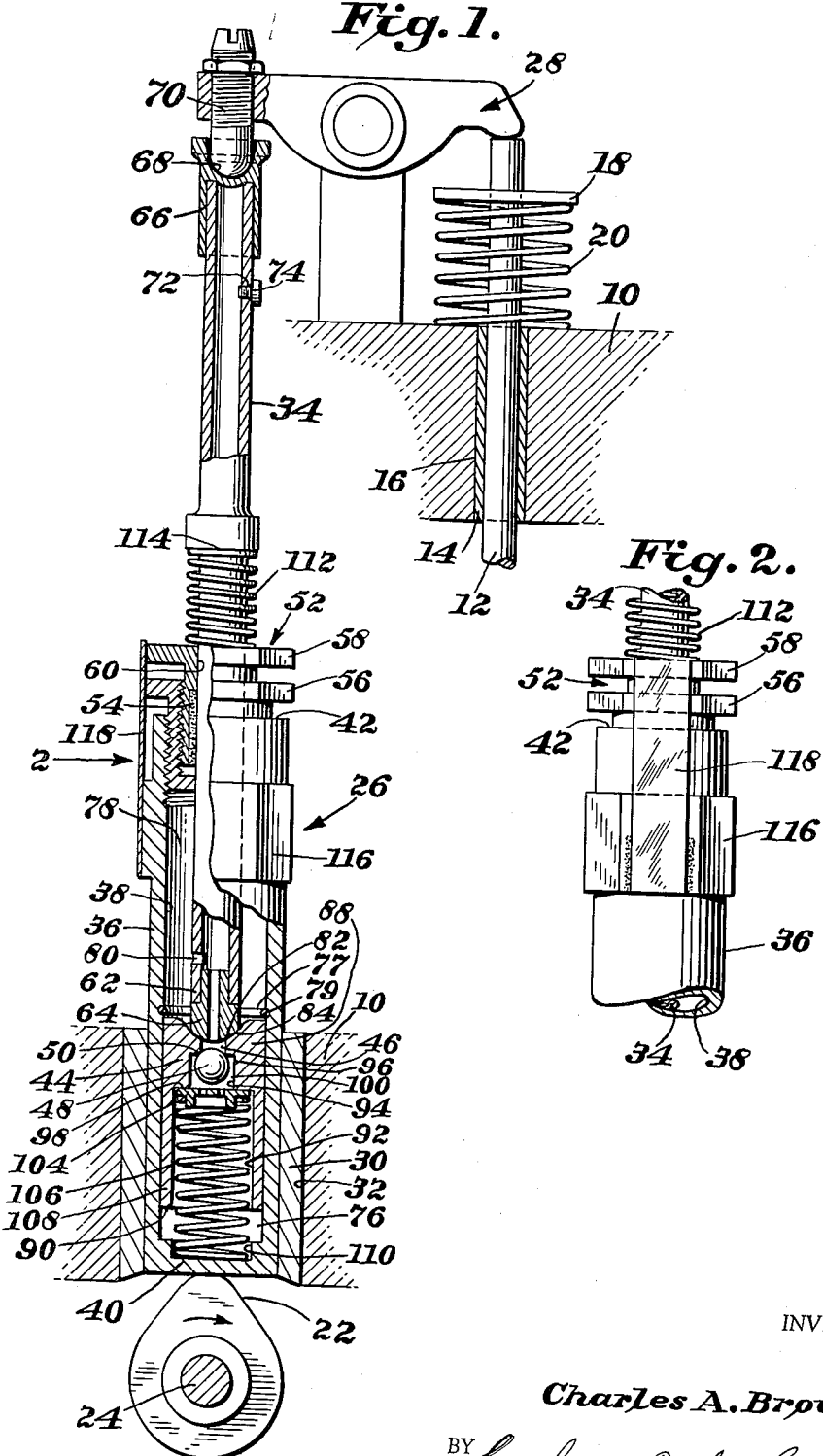
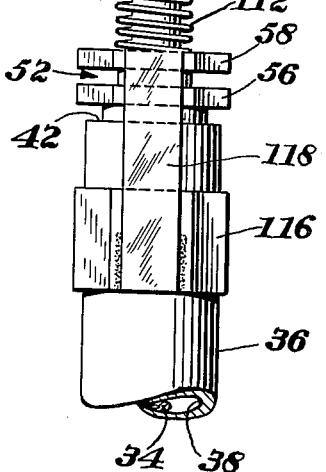
INVENTOR:
Charles A. Brown,
BY Cushman, Darby & Cushman
ATTORNEYS.

United States Patent Office 2,739,580
Patented Mar. 27, 1956

2,739,580

HYDRAULIC VALVE LIFTER

Charles A. Brown, South Charleston, W. Va.

Application October 13, 1953, Serial No. 385,781

7 Claims. (Cl. 123—90)

My invention relates generally to an improved hydraulically cushioned push rod construction for use in transmitting motion between machine parts and particularly to such a push rod for use in transmitting motion between the cam shaft and a valve of an internal combustion engine.

More specifically my invention relates to an improved self-contained hydraulically cushioned push rod having atomatic length adjustment whereby the mechanism will be in constant and continuous contact with associated machine elements.

Hydraulically cushioned push rods of this nature are well known and have been customarily employed for lifting the valves of internal combustion engines. Known devices of this type normally include a telescoping push rod and casing in which the push rod is secured to a hydraulically cushioned piston located within the casing.

Prior devices of this type have contained a large number of elements and therefore have been of a complicated nature, requiring extensive production costs and skilled labor for manufacture and assembly. Frequently the lubricating oil of an engine was employed as the hydraulic fluid of the push rod mechanism and as such fluid carries sludge, foreign particles and the like, especially after long service of an engine, the push rod mechanism became fouled and even inoperative. In prior self-contained devices complicated instrumentalities have been relied upon for maintaining a sufficient supply of hydraulic fluid and for providing a reservoir of fluid for meeting varying operating requirements. Provision for adding hydraulic fluid to the unit while still in operative position within an engine was unknown. When, through leakage, the supply of fluid became insufficient for operation, the unit had to be removed from the engine and separately repaired or replaced.

Furthermore, hydraulic valve-lifting devices of the past have been designed for use with specific types of engines and could not be freely and readily adapted for use in other engines without factory performed modifications.

With the above and other disadvantages of prior art construction in mind it is therefore an object of my invention to provide a self-contained hydraulic valve-lifting device of the type described utilizing a sealed independent supply of operating fluid, and in which such fluid may be readily replenished without the necessity of removing the device from its operative position within an engine.

A further object of my invention is to provide a device of the type described having a minimum amount of operating friction and which may be readily adapted for use in mechanisms having varied design requirements.

A still further object of my invention is to provide a hydraulic valve-lifting device which is durable, economical in manufacture, and efficient in use, and in which the relatively adjustable elements thereof may be secured against accidental displacement.

My invention will be more readily understood by reference to the embodiment presented in the accompanying drawings, in which:

Figure 1 is a side view in elevation, with portions broken away, illustrating my improved hydraulic valve-lifting unit as associated with the cam shaft and the valve-operating mechanisms of an engine, and Figure 2 is an elevational view of the spring locking feature of my invention, taken in the direction of arrow 2 of Figure 1.

Although in the embodiment herein presented, the hydraulically cushioned push rod construction of my invention has been shown associated with an engine having overhead valve motion-transmitting elements, it will be understood that the same may be employed in any push rod construction, as well as in a directly connected type of valve-actuating linkage of an engine.

Referring first to Figure 1 of the drawing, a portion of a cylinder block 10 of an internal combustion engine is shown having the stem 12 of a valve (not shown) slidably mounted within a sleeve bushing 14 fixed in a port 16 of the cylinder block 10. The valve stem 12 is provided with a conventional washer 18 and compression spring 20 which is interposed between the washer and the cylinder block 10 for urging the valve toward its seat and closed position. The force for opening the valve against the force of spring 20 is provided by a cam 22 of a cam shaft 24, such force being transmitted through the hydraulically cushioned valve lifter of my invention, generally designated by numeral 26, and a conventional valve rocker arm 28. My hydraulic valve lifter 26 is carried and fitted for reciprocating movement within a sleeve bushing 30 also fixed in a port 32 of the cylinder block 10.

The present invention is directed to improvements in the valve lifter 26 which is of the self-contained type employing a liquid such as oil as a cushioning and force-transmitting medium. Generally, the push rod mechanism or valve lifter of my invention consists of a pair of telescopically engaging members, a push rod 34 abutting the valve stem or other intermediate actuating element, i. e., a rocker arm assembly 28 and a casing 36 reciprocated by the valve-actuating cam 22.

The casing 36, preferably cylindrical in cross section, is provided with a machined exterior surface guided for reciprocating movement in the sleeve bushing 30 and a machined bore extends throughout substantially the length of the casing forming a cylinder 38 having a closed end 40 and an open end 42. The inner end of the push rod 34 engages a close fitting piston 44, slidably carried within the cylinder 38, having a centrally located longitudinally extending bore 46 adapted to be closed by a ball check valve 48 seating upon a valve seat 50 formed therein.

The open end 42 of the cylinder 38 will be closed and is provided with an apertured fluid-tight packing gland 52, preferably utilizing an asbestos graphite packing 54 carried by an adjusting screw 56 and retainer 58. An aperture 60 within the packing gland slidably receives the push rod 34 and forms a fluid-tight seal therewith for the portion telescoping within the cylinder 38 of the casing 36.

The push rod 34 is of hollow or tubular form provided at its inner end 62 with a tempered tip 64 normally engaging the valved piston 44, and having at its outer end a tempered push rod head 66 presenting a concave surface 68 for engaging an adjusting screw 70 of a rocker arm assembly 28. At a point adjacent the outer end or extremity of the push rod a threaded aperture 72 is provided normally sealed by a threaded plug or screw 74.

The sliding piston 44 divides the interior of the cylinder 38 into a pair of chambers, a fluid cushion chamber 76 located between the closed end 40 of the cylinder and the piston and a fluid reservoir 78 located between the piston and the packing gland 52 closing the open end 42 of the cylinder 38. A split wire ring 77 is carried by an annular recess 79 within the cylinder 38 for limiting the extent of movement of the piston 44. It will be noted that the hollow push rod 34 is provided with a port 80 whereby the fluid reservoir 78 and the hollow rod 34 are in communication with the fluid cushioning chamber 76 through the valved bore 46 of the sliding piston 44.

The tempered push rod tip 64 presents a convex portion 82 engaging a concave depression 84 of the end 88 of the sliding piston within the reserve fluid chamber 78 and the opposite end 90 of the piston is provided with a recess 92 substantially the width of the piston and extending throughout a major portion of the length of the same.

At the inner end of the recess 92 the bore 46 of the piston is enlarged as at 94 to present shoulder portions 96 and 98 forming a cage 100 for receiving a ball check valve 48. The shoulder 96 is provided with the valve seat 50 while the shoulder 98 provides a stop for a perforated plate 104 employed for retaining the ball valve 48 in close proximity to the valve seat 50. The valve retaining plate 104 is held in position by a piston biasing spring 106 presently described.

The recessed end 90 of the piston 44 forms a skirt portion 108 of the same and the spring 106 is carried interposed between the closed end 40 of the cylinder and the piston to continuously urge the piston into engagement with inner end 64 of the push rod 34. The spring 106 operates within the skirt portion 108 of the piston 44 abutting at one end a recess 110 of the closed end 42 of the cylinder 38. The spring 106 forces the plate 104 against the shoulder 98 of the piston, thus also biasing the piston toward and into engagement with the push rod 34, to thereby close the valve cage 100 and retain the ball valve 48 in close proximity to its valve seat 50.

For the purpose of keeping the push rod 34 tightly against the valve stem 12 or rocker arm assembly 28 there is provided a top spring 112 located about the push rod 34 and interposed between a shoulder 114 of the rod and the top of the packing gland 52. Thus, this spring decreases operating noise and assists the spring 106 in taking up any clearances between the elements of the valve operating linkage.

There is provided a hex portion 116 on the casing 36 adjacent the open end 42 thereof to assist in the insertion and removal of the mechanism into an engine port. To eliminate the possibility of the packing gland 52 becoming inoperative, there is utilized a leaf spring 118 welded or otherwise secured to one of the faces of the hex portion 116 of the casing 36. This spring 118 presses against similar hex portions of the packing gland retaining screw 58 and adjusting screw 56 to prevent undesired relative movement and resultant maladjustment of the packing gland 52.

In the assembly of my hydraulic push rod construction the spring 106, ball valve 48, apertured plate 104, and piston 44 are inserted within the casing 36 and held therein against displacement by the split wire ring 77 fixed in the annular groove 79. A partial charge of operating fluid may then be put into the cylinder 38 passing through the bore 46 of the piston 44 into the cushion chamber 76. Preferably, cushion chamber 76 should be completely filled with fluid to displace all of the air before the unit is assembled in an operating linkage. However, it is desirable to completely assemble the mechanism prior to completing the change of fluid.

Next a push rod 34 of proper length and carrying the spring 112 may be inserted into the aperture 60 of the packing gland 52 and the end 42 of the cylinder closed thereby with the push rod extending into engagement with piston 44.

The packing gland 52 will be secured in an adjusted position relative to the casing 36 by the leaf spring 118 secured to the hex portion 116 of the casing 36.

The assembled unit may now be placed into a port of an engine provided with a sleeve bushing 30 as shown in Figure 1 of the drawing. Preferably, the remaining portion of the charge of hydraulic fluid will at this time be introduced through the push rod mechanism into the reserve chamber 78 via the threaded port 72 subsequently sealed by the screw plug 74. A final length adjustment of the operating linkage will be effected by screw 70 of the rocker arm assembly 28.

In describing the operation of my improved push rod construction, it will be assumed that an upward thrust from the bottom of the push rod is to be conveyed to an overhead valve operating element such as the rocker arm assembly 28, as shown. When the thrust occurs the fluid in the hydraulic cylinder 76, assisted by the tension of spring 106, will convey the force to the piston 44 and in turn to the push rod 34. During this movement of the push rod mechanism, fluid under pressure will slip by the piston 44 into the reservoir space 78 with the result that the piston will move down very slightly into the cylinder, thus shortening the total effective length of the push rod. The check valve 48 in the piston 44, of course, prevents fluid from passing through the bore of the piston into the reservoir chamber. Therefore, any fluid passing into the reservoir chamber must pass by the closely fitted piston 44 which tends to resist such flow of fluid. When the thrust on the rod is relieved the spring 106 assisted by spring 112 operates to lift the piston to its normal operating position, i. e. against the split wire ring 77, and the volume of the cushioning chamber 78 is increased. This creates a suction therein which will open the check valve and draw operating fluid from the reservoir chamber back into the cushioning chamber 76. The push rod construction will then be extended to its normal length and again be ready to transmit a subsequent thrust and resist any sudden appreciable decrease in length.

Although packing glands such as the gland 52 of my invention have been effectively employed for providing fluid-type seals for the hydraulic operating fluid of push rod constructions, long continued use of these devices causes hydraulic fluid to escape through the packing glands and eventually the supply of operating fluid becomes insufficient for continued operation. Therefore, an important feature of my invention is the provision of the hollow push rod construction communicating with the reservoir chamber through a port 78 and having a threaded sealable opening 72 whereby the supply of operating fluid may be replenished while the unit is associated with operating elements of a valve-actuating linkage or the like. Thus, the supply of operating fluid can be replenished without the necessity of removing the unit from its position within an engine and destroying the adjusted relation of the elements of a linkage.

The provision of a hollow push rod separate from the piston 44 and of uniform cross section throughout the telescopic portion thereof provides a push rod construction wherein the push rod 34 may be readily removed from its association with the hydraulic cylinder 38 and replaced by a similar push rod of another length. Thus, the hydraulic push rod construction of my invention is readily adaptable in length to meet the requirements of a large variety of internal combustion engines or similar installations.

Another important feature of my invention is the construction of the piston 44 having the concave recess 82 engaging the tempered push rod tip 64 of the push rod 34 and also having the recess 92 and depending skirt portion 108 formed thereby for enclosing the spring 106. It will be seen that the effective length of the piston 44 is at a minimum whereby the force transmitted by the spring 106 and the operating fluid within the cushioning chamber 76 through the piston to the push rod tip will be through closely spaced points of pressure. Therefore, the tendency of the piston to ride against the interior surface of the cylinder 38 will be reduced, eliminating excessive friction between the relatively movable parts.

It will thus be seen that the objects of this invention have been fully and effectively accomplished and it will be realized that the embodiment described and illustrated for the purposes of disclosing the principles of the invention is susceptible to various changes without departing from such principles. Therefore, this invention embraces all modifications encompassed by the spirit and the scope of the following claims.

I claim:

1. A self-contained hydraulically cushioned push rod construction comprising: a casing having an internal cylinder closed at one end and open at the other, a hollow push rod telescopically received within the casing and projecting from the open end thereof, a packing gland and retainer tightly received within the open end of the cylinder having an aperture for slidably receiving the push rod and providing a fluid-tight seal therefor, a sliding piston within the cylinder abutting the inner end of the push rod, means for biasing the piston into continuous engagement with the inner end of the push rod a check valve formed within the piston, a fluid cushioning chamber within the cylinder between the closed end of the cylinder and the sliding piston, a reserve fluid chamber located between the piston and the packing gland of said cylinder communicating with the hollow push rod, the check valve of said piston and the fluid cushion chamber, said check valve permitting free passage of fluid through the piston into the cushion chamber and preventing flow of fluid from the cushion chamber into the reserve chamber.

2. A self-contained hydraulically cushioned push rod construction comprising: a casing having an internal cylinder closed at one end and open at the other, a hollow push rod telescopically received within the casing and projecting from the open end thereof, a packing gland and retainer tightly received within the open end of the cylinder having an aperture for slidably receiving the push rod and providing a fluid-tight seal therefor, a sliding piston within the cylinder abutting the inner end of the push rod, a check valve formed within the piston, a fluid cushioning chamber within the cylinder between the closed end of the cylinder and the sliding piston, a reserve fluid chamber located between the piston and the packing gland of said cylinder communicating with the hollow push rod, the check valve of said piston and the fluid cushion chamber, said check valve permitting free passage of fluid through the piston into the cushion chamber and preventing flow of fluid from the cushion chamber into the reserve chamber, and means located within the fluid cushion chamber for biasing the piston into continuous engagement with the inner end of the push rod and a second biasing means interposed between the casing and a shoulder formed on the push rod.

3. The structure as set forth in claim 1, wherein the packing gland and retainer are threadedly received within the open end of the cylinder and locked in an adjusted relation with respect to the casing.

4. In a self-contained hydraulically cushioned push rod mechanism including a casing having an internal cylinder closed at one end and open at the other, a push rod telescopically received within the casing and projecting from the open end thereof, a packing gland and container threadedly received within the open end of the cylinder having an aperture for slidably receiving the push rod and providing a fluid-tight seal therefor, a sliding piston having a longitudinal bore closely fitting the walls of the cylinder and abutting the end of the push rod, means for biasing the piston into continuous engagement with the inner end of the push rod a check valve located within the longitudinal bore of the piston, a fluid cushioning chamber located within the cylinder between the closed end thereof and the sliding piston and a reserve fluid chamber located within the cylinder between the piston and the packing gland of said cylinder, the combination of a push rod of constant cross-section throughout the telescopic portion thereof, readily removable and replaceable through the aperture of said packing gland.

5. In a self-contained hydraulically cushioned push rod mechanism including a casing having an internal cylinder closed at one end and open at the other, a push rod telescopically received within the casing and projecting from the open end thereof, a packing gland and container threadedly received within the open end of the cylinder having an aperture for slidably receiving the push rod and providing a fluid-tight seal therefor, a sliding piston having a longitudinal bore closely fitting the walls of the cylinder and abutting the end of the push rod, means for biasing the piston into continuous engagement with the inner end of the push rod a check valve located within the longitudinal bore of the piston, a fluid cushioning chamber located within the cylinder between the closed end thereof and the sliding piston and a reserve fluid chamber located within the cylinder between the piston and the packing gland of said cylinder, the combination of a hollow push rod communicating with the reserve fluid chamber and the bore of said piston having a fluid replenishing aperture adjacent the outer extremity thereof adapted to be sealed.

6. A self-contained hydraulically cushioned push rod mechanism comprising: a reciprocable casing having an internal cylinder closed at one end and open at the other, a hollow push rod telescopically received within the casing and projecting from the open end thereof, a packing gland and retainer tightly received within the open end of the cylinder having an aperture for slidably receiving the push rod and forming a fluid-tight seal therefor, a sliding piston having a longitudinal bore therein closely fitting the walls of the cylinder and abutting the inner end of the push rod, a check valve located within the longitudinal bore of the piston, said piston having a cylindrical recess within the end thereof adjoining the closed end of the cylinder whereby the length of the piston for transmitting movement to the inner end of the push rod is at a minimum, spring biasing means received within said recess and interposed between the piston and the closed end of said cylinder, a fluid cushioning chamber located within the cylinder and formed by the closed end thereof and the recessed portion of the piston and a reserve fluid chamber located within the cylinder between the piston and the packing gland of the cylinder communicating with the hollow push rod, the bore of said piston and the fluid cushion chamber.

7. A structure as set forth in claim 6 wherein the longitudinal bore of the sliding piston is provided with a shoulder forming a valve seat, a valve cage receiving a ball check valve, and an apertured plate held in valve retaining position on the open end of the cage by the spring biasing means interposed between the piston and the closed end of the cylinder.

References Cited in the file of this patent

UNITED STATES PATENTS

| | | |
|---|---|---|
| 2,516,172 | Baldwin | July 25, 1950 |
| 2,634,714 | Randol | Apr. 14, 1953 |

FOREIGN PATENTS

| | | |
|---|---|---|
| 464,098 | Canada | Mar. 28, 1950 |